Patented Nov. 14, 1922.

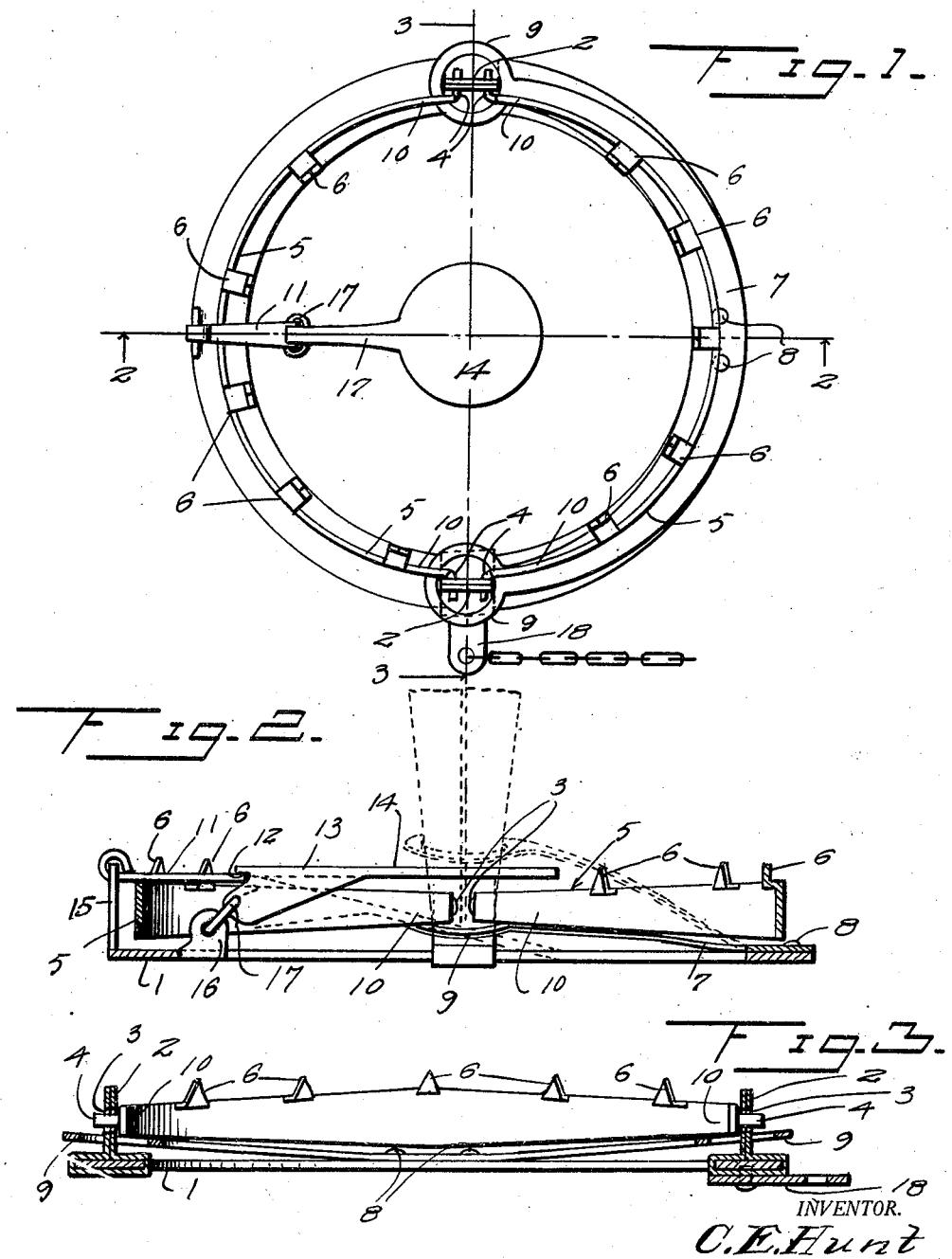

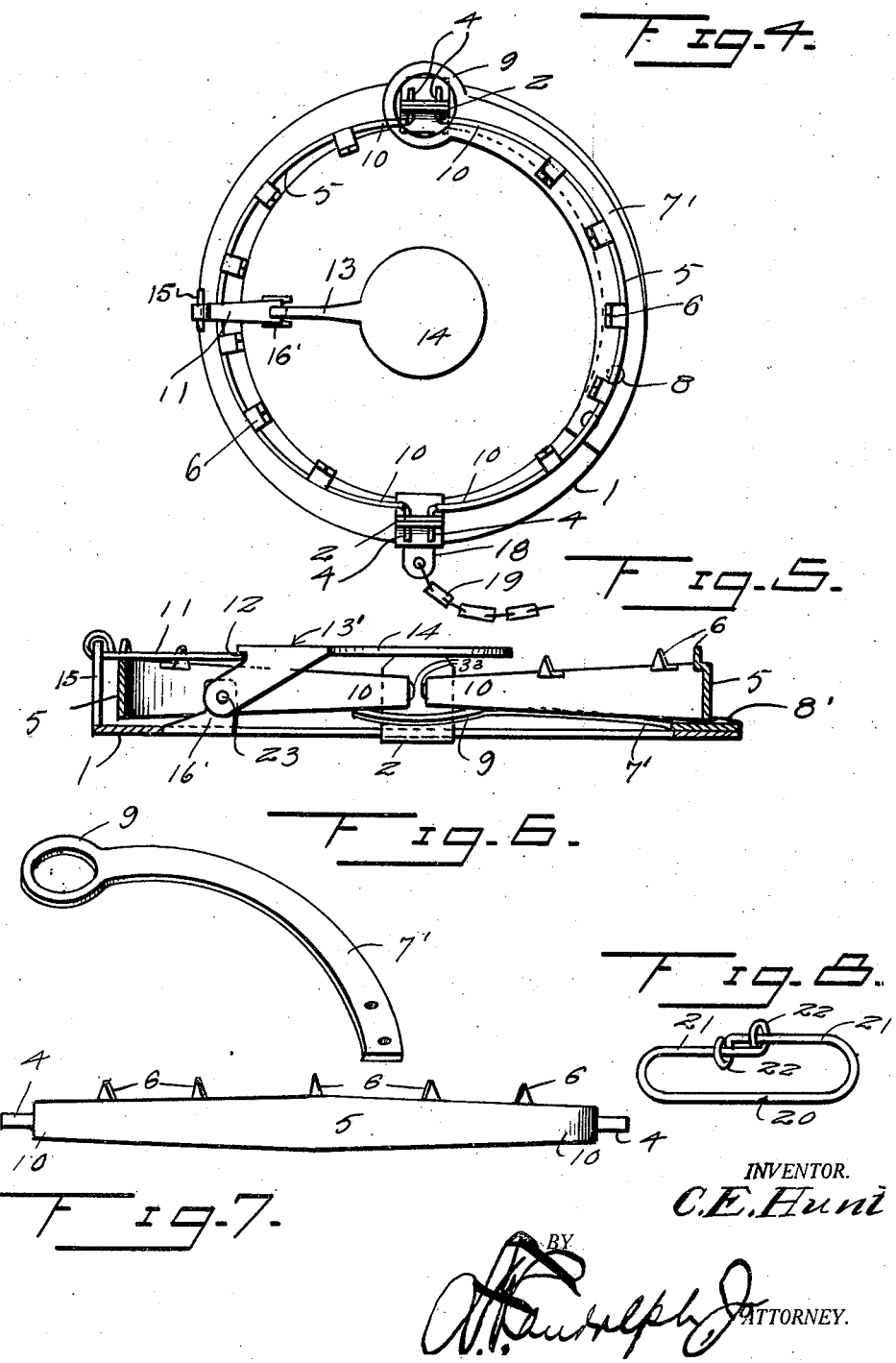

1,435,472

UNITED STATES PATENT OFFICE.

CHARLES E. HUNT, OF RAQUETTE LAKE, NEW YORK.

ANIMAL TRAP.

Application filed June 15, 1920. Serial No. 389,168.

*To all whom it may concern:*

Be it known that I, CHARLES E. HUNT, a citizen of the United States, residing at Raquette Lake, in the county of Hamilton and State of New York, have invented certain new and useful Improvements in Animal Traps; and I do hereby declare the following to be a full, clear, and exact description of the invention, such as will enable others skilled in the art to which it appertains to make and use the same.

This invention has relation to certain new and useful improvements in animal traps and has for its primary object the provision of an animal trap which will be of simple construction and operation and yet highly efficient in use and inexpensive to manufacture.

Another object of the invention resides in the provision of a trap of the character stated and of the spring jaw type which may be employed for trapping large and small animals by arranging the base plate over a hidden pocket or hole over which projects the releasing pan as the animal presses upon the latter so as to release the spring jaws and cause the latter to clamp the leg of the animal at a point above the joint thereof so as to securely hold the victim.

A further object of the invention resides in the provision of a trap of the character stated in which the gripping jaws will normally rest upon the circular supporting base ring or base plate but may be readily forced outwardly thereover by the spring actuating member when the pan is pressed downwardly and released from the latch member which extends over one of the spring jaws when the trap is set to prevent the jaws from being moved upwardly by the spring actuating member.

The invention has for a still further object the provision of a trap of the character set forth which will be composed of the minimum number of parts of simple construction and arrangement and which may be readily set and may also be readily removed from the victim without injury to the latter.

With the foregoing and other objects in view, as will appear as the description proceeds, the invention consists in the novel construction, combination and arrangement of cooperating elements as hereinafter more specifically set forth, claimed and shown in the accompanying drawings.

In the drawings forming a part of this application,

Figure 1 is a plan view of the preferred form of the invention with the trap set ready for a victim.

Figure 2 is a transverse vertical section on the plane of line 2—2 of Figure 1, the operative parts being indicated in their operated positions by dotted lines.

Figure 3 is a view similar to Figure 2 and at right angles thereto, said view being taken on the plane of line 3—3 of Figure 1, looking in the direction indicated by the arrows.

Figure 4 is a plan view of the trap, showing a slightly modified form thereof, the trap being shown in set condition.

Figure 5 is a vertical transverse sectional view through the form of trap shown in Figure 4 and on an enlarged scale.

Figure 6 is a detail perspective of the arcuate spring, removed.

Figure 7 is a detail view of one of the clamping jaws employed in the two forms of the invention.

Figure 8 is a detail view of one link of the preferred form of chain employed in connection with the trap.

Referring more in detail to the drawings, in which similar reference characters designate corresponding parts throughout the several views, 1 indicates the flat circular base or body member which has oppositely directed perforated ears 2 extended in pairs from opposite sides of the member 1 and at diametrically opposite points. These ears 2 are bent over toward one another upon the upper face of the base or body member 1 and then extended upwardly with their pairs of perforations 3 registering to receive the outturned reduced ends 4 for the semi-circular jaws 5, which latter are provided with spaced teeth 6 upon their opposed edges, or the edges which move toward one another when the jaws 5 are forced upwardly to clamp upon opposite sides of the leg of a victim, as will be later clearly understood. It will be understood by those familiar with this art that the main or central portion of the jaws 5 are increased in width to lend strength and rigidity thereto. A semicircular or double jaw operating spring 7 is secured by its central portion to the upper face of the base or body member 1, as shown at 8, at a point intermediate the pairs of ears 2 and the oppositely curved ends of the jaw operating spring 7 are extended toward the pairs of ears 2 and terminate in enlarged rings or eyes 9 which surround the lower smaller end portions 10 of the jaws 5 and have a tendency to ride upwardly thereon and thereby draw together the main portions of the gripping jaws 5, owing to the fact the ends of the jaw operating spring 7 are curved upwardly from the point of connection of the jaw operating spring 7 with the base or body member 1 toward the free end of said jaw operating spring 7. The eyes 9 are of such a size, however, as to permit the same to pass downwardly over the parallel ears 2 and the outturned ends 4 of the jaws 5 when it is desired to set the trap by swinging the jaws 5 downwardly to a horizontal plane above the base or body member 1, as shown in Figures 1 to 3 inclusive of the drawings. When the jaws 5 are pressed downwardly into this position, the latching bar 11 may be extended across one of the jaws 5 and the free end of the latching member 11 engaged in the notch 12 provided therefor in the handle 13 of the releasing pan 14 as clearly shown in Figures 1 and 2 of the drawings. It will be seen that the outer end of the latching member 11 is pivotally mounted in the upper end of the upstanding ear 15 carried by the base or body member 1 at a point diametrically opposite the connection 8 of the double jaw operating spring 7 with the base or body member 1. The handle 13 of the releasing pan 14 is also connected at a point below and offset from the notch 12 thereof, with an outstanding ear 16 of the base or body member 1, by means of the connecting ring 17, thereby permitting swinging movement of the releasing pan 14 in any direction when engaged by the pawl of an animal such as a bear, thus eliminating danger of breaking off the pan 15 or the handle 13.

Due to the fact that the latching bar 11 is pivoted to part 16 above the pivot of pan 14, the action of spring 7 through the medium of one of the jaws exerted against the same effectively maintains said latching bar 11 in set engagement with the pan.

It is to be understood that this trap should be positioned over a hole or pocket with the releasing pan 14 in the center of the base or body member 1 and over the hole or pocket, whereby the foot of the animal will drop into the hole or pocket as the jaws 5 are forced upwardly and into engagement with the limb of the animal under action of the spring 7, so as to securely grip the limb of the animal at a point above the joints thereof and securely hold the victim. The trap is attached to a suitable chain to prevent the animal from carrying off the trap. While any suitable chain may be employed I have shown a special form of chain connected by one end with the ear 18, projecting from the edge of the base or body member 1, preferably at a point adjacent one of the pairs of ears 2 so that the chain may be attached opposite one end of the gripping jaws 5. The chain is designated by the numeral 19 and is preferably composed of elongated links 20, each one of which is constructed of a continuous member having overlapped end portions 21 at one side with oppositely turned eyes 22 formed at their extremity with each eye 22 passed around the opposite portion 21 of the member from which the link 20 is formed. It will therefore be seen that a double interlocking of the end portions 21 for each link 20 is provided at one side of the link to prevent the link from being opened by a strain upon the opposite ends thereof.

In the modified form of the invention shown in Figures 4 to 6 inclusive, the base or body member 8 is of the same construction as in the preferred form and therefore needs no further detail description. All of the parts which have the same reference numeral applied thereto in the modified form and in the preferred form are of the same construction, and therefore will not be again described in detail.

In the modified form of the invention, however, the jaws 5 are operated by a single or arcuate jaw operating spring 7', which is secured by one end to the base or body member 1, as shown at 8' and has formed at its opposite end or upwardly curved end the eye 9' which has sliding engagement on one end of the gripping jaws 5 as this single jaw operating spring 7' will be sufficient for the lighter and smaller trap. In this smaller and lighter or modified form of trap, the handle 13' is also formed of a lighter material bent centrally upon itself and receiving in its lower corner the upstanding double ear 16' projecting from the edge of the base or body member 1. The pivot pin 23 is then passed through the lower corner of the handle 13' and the double ear 16' engaged therein so that the releasing pan 14 may have a vertical swinging movement on the pivot pin 23 when the pan is pressed downwardly by a victim and a latch member 11 thereby released to permit upward swinging movement of the clamping jaws 5 under influence of the jaw operating spring 7'.

The operation of the trap may be briefly stated as follows. After the trap has been set as shown in Figures 1, 2, 3, 4 and 5, and properly positioned, it is simply necessary for the victim to tread upon the releasing pan 14, causing the latter to swing downwardly upon its pivot, thereby releasing the latching member 11. The jaws 5 will immediately swing upon their pivot ends, to operative position, under influence of the springs 7 or 7', to thoroughly grip the opposite sides of the legs or other part of the victim extended between the jaws 5.

While the preferred embodiment of the invention has been shown and described, it will be understood that minor changes in the details of construction and arrangement of parts may be resorted to within the scope of what is claimed without departing from the spirit of the invention.

What is claimed is:

A trap having a base, ears consisting of strips embracing said base and having their terminals in contact and upstanding, said terminals having registering openings therethrough, first and second coacting jaw members having pivot portions extending through said openings, a spring on said base to urge the first jaw member toward the second jaw member, said spring having an opening at its active end in which a pair of said terminals are disposed, a pan, means to pivotally mount said pan on said base, a latch member to engage said pan, means to pivotally mount said latch member on said base above the first mentioned means, and said latch member extending across the first jaw whereby the latter will contact therewith and through the urgency of said spring maintain the pan in a set position.

In testimony whereof I affix my signature in presence of two witnesses.

CHARLES E. HUNT.

Witnesses:
W. A. PULLING,
CHAS. EGENHOFER.